Sept. 21, 1965  R. L. CARLSTEDT  3,207,009
VIBRATION DAMPING DEVICE
Filed April 8, 1964  4 Sheets-Sheet 1
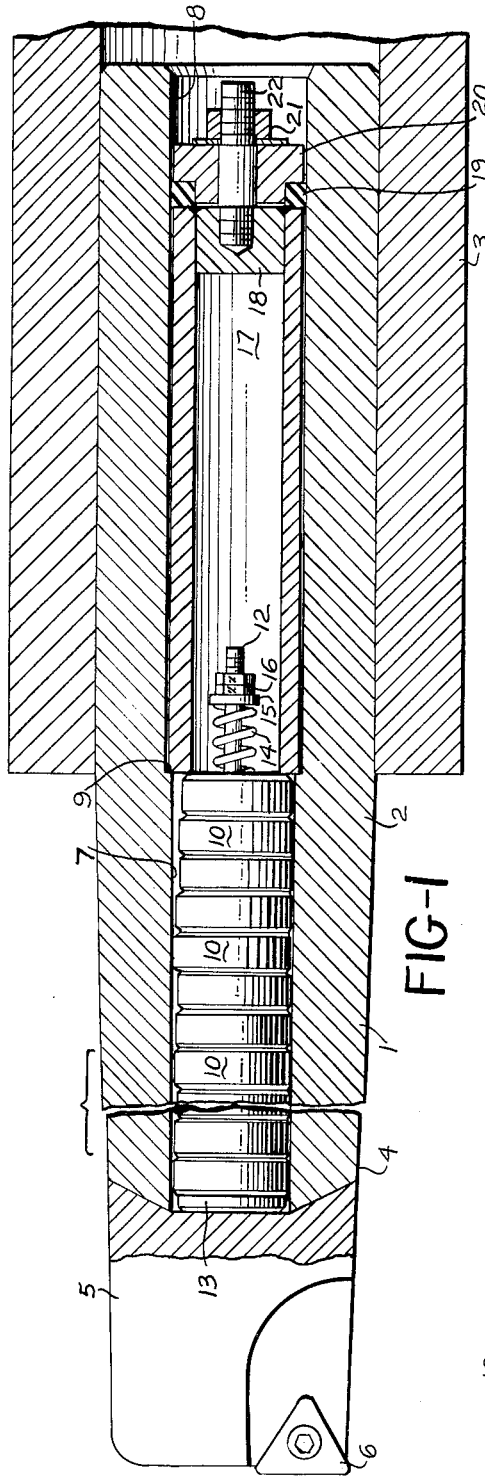
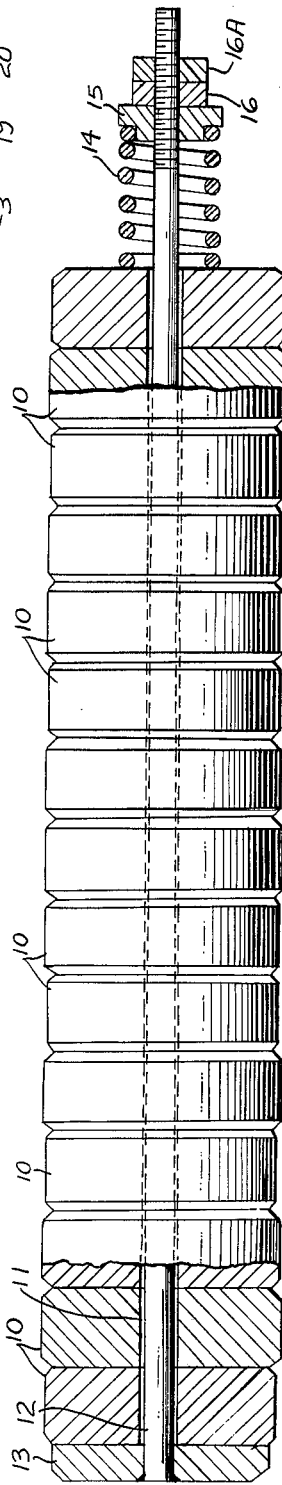
INVENTOR.
RAGNAR L. CARLSTEDT
BY Toulmin & Toulmin
ATTORNEYS Sept. 21, 1965    R. L. CARLSTEDT    3,207,009
VIBRATION DAMPING DEVICE
Filed April 8, 1964    4 Sheets-Sheet 2
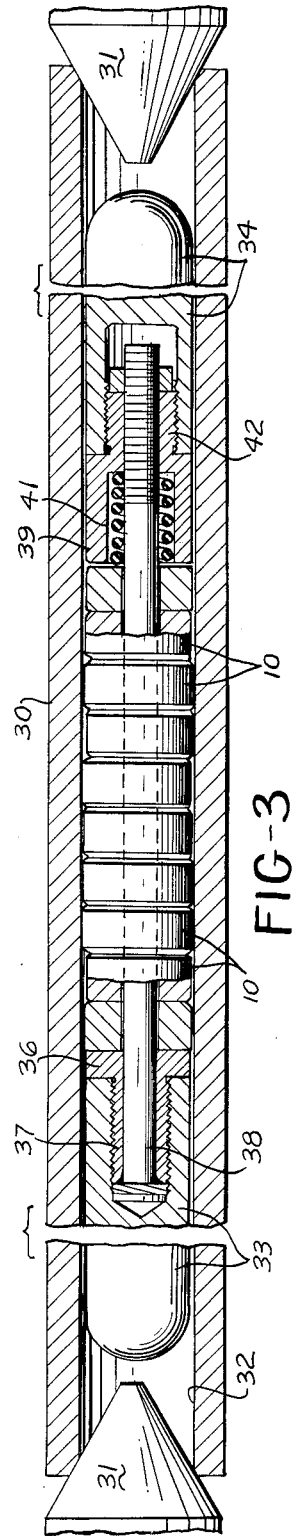
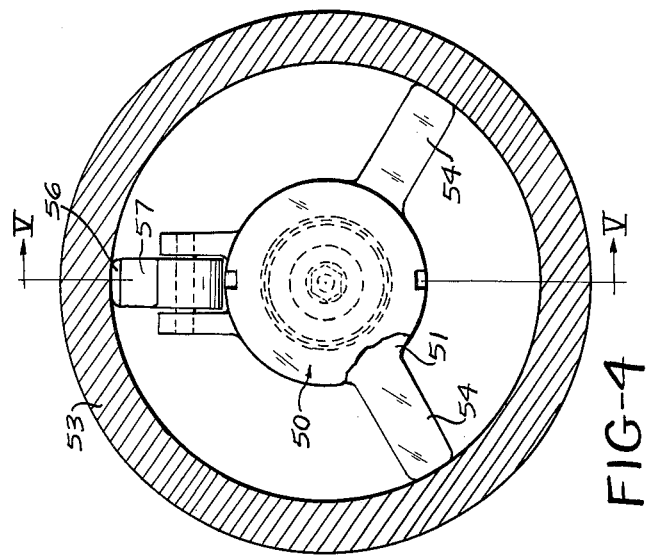
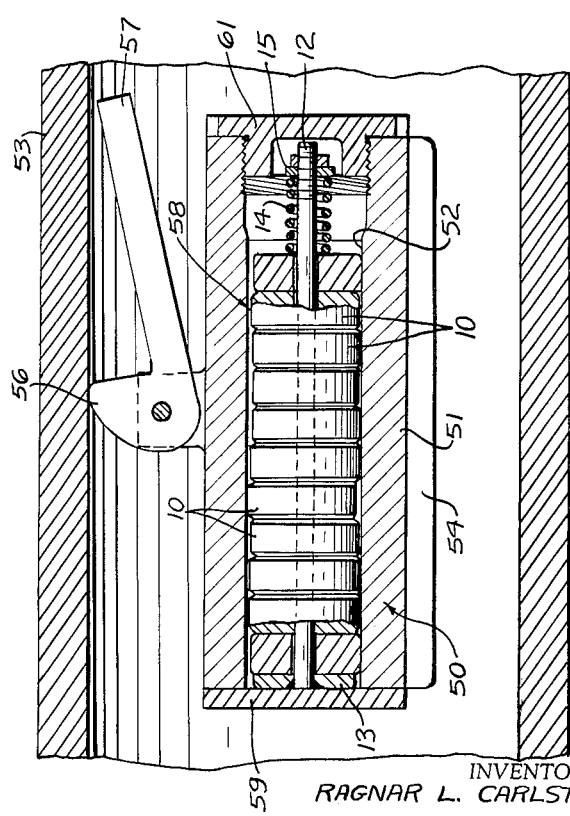
INVENTOR.
RAGNAR L. CARLSTEDT
BY Toulmin & Toulmin
ATTORNEYS

United States Patent Office 3,207,009
Patented Sept. 21, 1965

3,207,009
VIBRATION DAMPING DEVICE
Ragnar L. Carlstedt, Valley Heights, Ligonier, Pa., assignor to Kennametal, Inc., Latrobe, Pa., a corporation of Pennsylvania
Filed Apr. 8, 1964, Ser. No. 358,341
24 Claims. (Cl. 77—58)

This application is a continuation-in-part of my prior application Serial No. 188,209, entitled: Vibration Damping Device, filed April 17, 1962, and now abandoned, and is also related to my co-pending application Serial No. 225,438 filed September 24, 1962, and entitled: Method and Apparatus for Damping Vibrations.

This invention relates to a method and apparatus for vibration damping device and, more particularly, to such a method and apparatus particularly adapted to reduce vibration in a machine tool member or in a workpiece being machined.

Excessive vibrations, frequently called "chatter," between the cutting element of a machine tool and the surface of the workpiece causes poor surface finish, undersize workpiece, tool breakage, and other undesired effects that have long plagued machining operations. Such vibrations arise especially when one or both of the tool and workpiece include a long unsupported length that will permit yielding of the workpiece or tool.

When chatter does occur the machining speed must be reduced even when steady rests and the like are employed.

When all of the other causes of vibration have been eliminated by use of the stiffest and most advanced machine tool design, there still remains an unavoidable source of vibration in the beam that must, for many operations, take the cutting load. For example, a long boring bar with a single cutting element and forming a cantilever beam, at its outboard end will, by its interaction with the workpiece, tend to vibrate, and this will happen whether it is the bar or the work that turns.

In cases where the cutting element can be rigidly supported, if the workpiece is long and slender and, from its nature, can be adequately supported only between centers or at one end, the workpiece will vibrate relative to the tool, with the same bad effects.

In each of these cases, the vibration may be considered to be self-excited, because it is generated by the interaction of the cutting element and the workpiece. Such self-excited vibration tends to correspond, in frequency, or to have harmonics that correspond in frequency, to the natural frequency of the cantilevered tool, or to the natural frequency of the simply supported or cantilevered beam of the workpiece, and therefore tends to increase in amplitude under small disturbing forces.

While the amplitude will generally be greatest at the free end of the tool, or at the center, or at the unsupported end of a cantilevered workpiece, the pattern of vibration, such as the spacing of the nodes and the kind of harmonics generated, may vary widely under different conditions and from one point along a workpiece to another. These problems, created by self-excited vibrations, have long been recognized in the machine tool industry; but their complexity has heretofore defied an adequate solution. It will be understood the "vibration" as employed herein does not refer to simple deflection or yielding of the tool or workpiece which may be brought about simply by large forces developed thereon but refers to vibrations or oscillations which tend to be maintained or increased when energized by a selectively small diisturbing force.

It is among the general objects of this invention to provide a vibration damping device that will substantially reduce or eliminate chatter and vibration, especially of the self-excited type, in machine tool members and in workpieces being machined.

Another object is to provide an improved vibration damping device that will be effective over a wide range of frequencies and different modes of vibration.

Another object is to provide an improved vibration damping device that will absorb and dissipate energy from a vibrating member by inertial impacts of a multiplicity of inertial elements and that will be equally effective whether the vibrating member is stationary or rotating.

Another object is to provide an improved vibration damping device in the form of a convenient package that will be effective in a wide variety of applications and have advantages not found in existing devices.

Still another object is the provision of an arrangement for damping out torsional vibration in rotating elements.

A further object is the provision of a method of damping vibration which is more effective and simpler to apply than previously known methods of damping.

Still other objects of the invention will be apparent from the following description of a preferred embodiment, in connection with the attached drawings, in which:

FIGURE 1 is an elevation, partly in section, of a boring bar provided with a vibration damping device in accordance with this invention;

FIGURE 2 is an enlarged elevation, partly in section, of the packaged elements of the vibration damping device of FIGURE 1;

FIGURE 3 is an elevation, partly in section, of a modified form of vibration damping device for damping vibrations of a tubular workpiece mounted between lathe centers for machining its outer surface;

FIGURE 4 is an end elevation, partly in section, of means for mounting the vibration damping device of FIGURE 3 in a tubular workpiece of large internal diameter;

FIGURE 5 is a sectional elevation along the line V—V of FIGURE 4;

Figure 6:
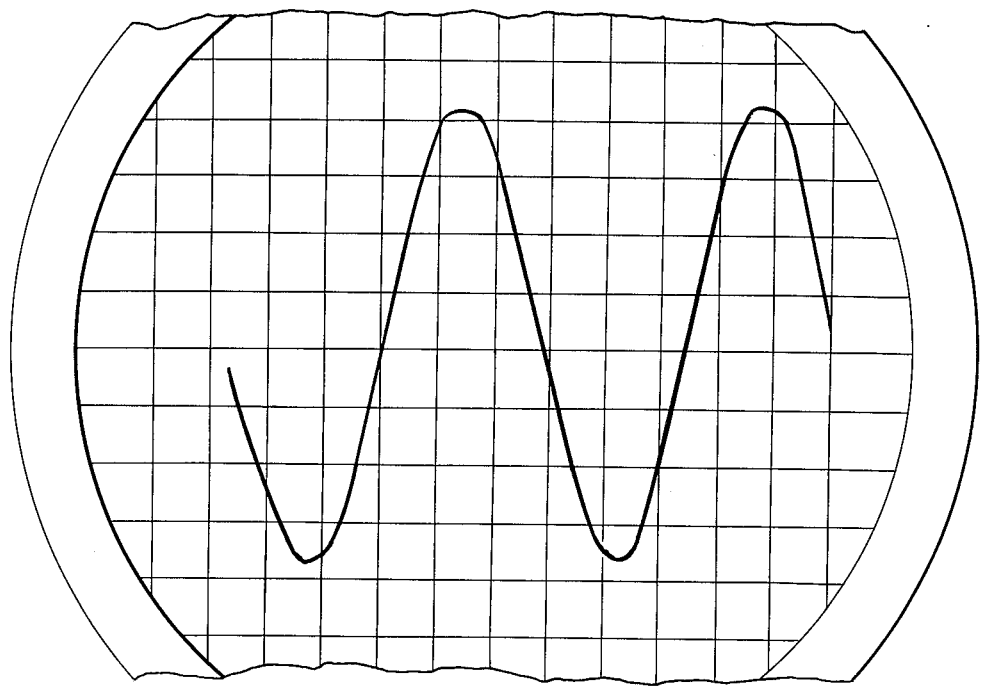
FIGURES 6 and 7 are reproductions of an oscilloscope trace showing a boring bar, without and with a vibration damping device, respectively.

The vibration damping device of this invention utilizes a longitudinal bore in the member whose transverse vibrations are to be damped. A multiplicity of heavy disc-like impact elements are contained in this bore. They are movable radially of the bore, so that, as the member vibrates, the disc elements will impact the wall of the bore with repeated impacts. The radial clearances between disc-like impact elements and bore are such that these impacts will oppose the transverse vibrations of the member and thereby damp those vibrations.

Referring to FIGURES 1 and 2, a boring bar 1 includes a cylindrical portion 2, which is mounted in a conventional holder 3 (shown fragmentarily in FIGURE 1), and an overhanging tapered portion 4. The outboard end of the overhanging portion is provided with a tool head 5, on which is mounted a cutting element 6. When a tool of this type is used to machine a workpiece (not shown), such as the bore of a gun, it is especially subject to vibration caused by varying interaction forces between the cutting element and the surface of the workpiece. Such vibration, when it occurs, tends to be at the natural frequency of the bar and to be greatest at its outboard end and at least at its inboard end.

To counteract such vibration, the bar is provided with, if it does not already have, cylindrical bores 7 and 8, extending axially from its inboard end to the head of the tool. Bore 7 is confined to the overhang of the bar; it is of somewhat smaller diameter than bore 8 and is separated therefrom by a shoulder 9. The outer end of bore 7 is closed, as by the tool head 5.

In the bore 7 is disposed a number of boring impact elements disc 10. Each disc element is a rigid member preferably made of a high density metal, for example, an alloy comprising essentially ninety percent tungsten and ten percent an alloy of nickel and copper, and having a specific gravity of about 17. The diameter of each disc element is slightly smaller, preferably between about two to four thousandths inch less, than the diameter of bore 7. Within those approximate limits, some of the disc elements may desirably have different diameters from other disc elements, so that some will have greater clearance in the bore than others; and the disc elements are preferably assembled in some random sequence. (In the drawings, the clearances between the disc elements and the cylindrical wall of the bore have been greatly exaggerated for clarity.)

Each disc element is provided with a central axial hole 11, through which passes a steel rod 12, there being greater clearance between the disc elements and rod than between the disc elements and the wall of bore 7. On the other end of rod 12 is welded a steel retaining member in the form of a flange 13, which may also be in the form of a disc and is of smaller diameter than the elements on the rod disc. A coil spring 14 is placed over the threaded inner end of the rod, confined between the innermost disc element and a second retaining member in the form of a threaded adjusting knob 15 and lock nuts 16 and 16a.

The spring loading against the disc elements is quite light, sufficient only to assure that the disc elements are in random radial positions relative to the axis of the bore when the bar is momentarily at rest. The axial faces of the disc elements are ground flat and smooth, so that they will glide easily in contact with each other. Generally, the larger the number of disc elements in the bore 7, the greater will be the decay rate of the vibrations being damped. However, there is a practicable upper limit to the number of disc elements, as where they become too thin, relative to their diameter, to produce the desired inertial impacts.

The disc elements supported on the rod form a package that substantially fills bore 7 and is retained with some axial freedom therein by a sleeve 17, which fits in the adjacent bore 8 with the other end of the sleeve against shoulder 9. The inner end of sleeve 17 is closed by a plug 18, which may be welded therein. A rubber seal ring 19 is adapted to be compressed between the inner end of the sleeve and a sealing member 20 by a nut 21 threaded on a stud 22 secured in plug 18. When the seal ring is compressed, it not only seals bore 7 and 8 against entrance of moisture or dirt, but also frictionally holds sleeve 17 in place in bore 8.

It is a feature of the present invention that radial movement of the disc elements in the bore is not appreciably or significantly restrained by any frictional engagement with the vibrating member. This is to be contrasted with other available damping devices in which the vibratory energy of the member is dissipated as heat, resulting entirely from radial friction between inertia masses and either the vibrating member or friction plates that are radially fixed relative to that member. In the preferred embodiment shown in the drawings, there is no radial frictional engagement between the disc elements and either the vibrating member or any other element, such as sleeve 17, that is radially fixed relative to that member.

Considered as a unitary package assembled on rod 12, the disc elements are completely free to move radially of the bore; and each disc element is free to do so separately and independently of any other, except as there may be frictional restraint between adjacent disc elements themselves (or between an end disc element and either flange 13 or spring 14). Absolute or substantial freedom of radial movement generally, together with limited interdependence of radial movement between adjacent disc elements characterize and determine the damping functions of the disc elements in the present invention. They damp vibration by impact, that is, by knocking against the bore wall of the vibrating member when disc element and wall are moving relatively, which may be in opposite directions or may be in the same direction. In any case the impact opposes the tendency of the member to vibrate. Such impacts tend to arrest transverse movement of the member and do so more successfully when the impacts are delivered to the member at the proper time.

Since a vibrating member of the type under discussion generally has a complex pattern of vibration, in which different portions at any given moment are at different points in the vibration cycle, it is important that the damping impacts of each disc element should not necessarily be delivered at the same instant of time, but in a sequence ordered by the particular mode of the vibrating member. Such a result is attained with the present invention, partly because of the multiplicity of the disc elements which permits multiple and non-simultaneous impacts and partly because of their limited interdependence, which determines, along with the radial clearance between disc elements and bore, the timing of individual impacts and which can be varied to suit specific conditions by adjusting the axial loading of the spring in the disc element assembly.

As peviously stated, the axial loading of the spring is, as a general rule, just sufficient to maintain the disc element in random radial positions in the bore when the vibrating member is momentarily at rest. The resulting slight frictional resistance to radial movement of each disc element relative to its immediately adjacent disc element somewhat improves the damping effect of the device, probably by causing the impacts of some of the disc elements against the wall of the bore to be slightly delayed relative to the impacts of other disc elements. Among other benefits, such delay tends to decrease the possibility of the disc elements themselves getting into phase with the vibrating member (which, of course, would increase the amplitude of vibration).

While the spring loading of the disc element enables some of the disc elements to steal energy from the radial movement of other disc elements and dissipate that energy in the form of heat, the amount of energy so dissipated is restricted to the disc element package and, although it reduces the forces of impacts against the bore wall, such reduction is insignificant and outweighed by the advantages of delayed impacts. The effect of the spring, when adjusted, may become noticeable in certain cases, which seems to be a "tuning" of the impact elements to the vibratory member.

It should be understood that the packaged form of the disc element which has been described above, represents a preferred, but not the only, form that this invention may take. For example, non-packaged disc elements may be used in the bore of the vibrating member and confined therein under light and adjustable spring pressure. In such case, the disc elements would be imperforate and the spring would confine them against an end wall of the bore. In such case, the end disc element will be in radially sliding frictional engagement with the end wall, and there will be some frictional dissipation of energy between that disc element and the vibrating member (not present when the packaged form of disc elements is used). However, with a multiplicity of disc elements, only a very small amount of damping will occur as a result of frictional engagement between a disc element and the end wall of the bore; substantially all of the damping will result from impacts of the disc elements against the wall of the bore.

An additional advantage resulting from the fact that vibration of a member is damped with this invention by impacts from a multiplicity of disc elements against the wall of a bore in the member, is the reduced hysteresis loss (i.e., a smaller stress-strain hysteresis loop) than in the case where damping occurs by radial frictional engagement between multiple disc elements and friction surfaces that are radially fixed relative to the vibrating member.

The present invention may also be used to damp vibrations in a tubular workpiece. For example, in FIGURE 3 is shown a tubular bar 30 held between lathe centers 31. This bar is adapted to be rotated by one of the centers through means not shown, while its outer surface is being machined by a cutting tool, also not shown. Regardless of the stability of the cutting tool, the machining operation will tend to develop vibration in the workpiece, particularly when the cutting tool approaches the middle portion of the workpiece. To counteract such vibration, a package of disc element similar to that shown in FIGURE 2 may be inserted in the bore 32 of the tubular workpiece, the disc element being of suitable diameter to have proper clearance with the wall of the bore. Since the vibration will be greatest at the center of the workpiece, it is desirable to concentrate the disc element in that region.

To keep them there without restraining their radial freedom, the ends of the disc element package may be fitted with tubular housings 33 and 34 of smaller diameter than the disc element and extending almost to the lathe centers at the ends of the workpiece. To accommodate these end housings, the disc element package is modified slightly from what has been previously described in connection with FIGURES 1 and 2. At one end, flange 36 (which performs the same functions as flange 13 in FIGURES 1 and 2) is provided with an extended neck 37. A rod 38 passes through this neck and is welded to it. The outside of this neck is threaded, and housing 33 is screwed thereon.

At the other end of the disc element package, the adjusting knob 39 (corresponding to knob 15 in FIGURES 1 and 2) has a counterbored portion 41 that substantially encloses the coil spring and a reduced neck portion 42, which is threaded to receive the other housing 34. Housings of different lengths may be made available to accommodate tubular workpieces of different size. In operation, the damping device of FIGURE 3 functions in the same way as that previously described in FIGURES 1 and 2, and the structures of the two devices are otherwise similar.

Where it is desired to damp the vibrations of a tubular workpiece of relatively large internal diameter, one may often use to advantage the adapter unit shown in FIGURES 4 and 5. This unit 50 includes a tubular central portion 51, having a longitudinal bore 52 that is concentrically mounted inside the workpiece 53. The mounting means includes two radially extending legs 54, spaced 120° apart and adapted to rest on the inner surface of the workpiece.

A pivoted cam 56 is mounted on the top of the unit 50 and has an actuating lever 57 that permits the unit to be locked in place inside the workpiece and centered therein. When the workpiece vibrates, so will the adapter unit. In the bore 52 is disposed a disc element package 58 of the type described in connection with FIGURES 1 and 2, and in which the same parts are identified by the same numerals. This package is confined in the bore between a closure plate 59 welded to unit 50 at one end of the bore and a screw plug 61 threadably received in the other end of the bore. Moreover, the rod 12 is of such a length that it serves to limit the axial movement of the package. In this modification, the adapter unit is equivalent to damping those of the workpiece directly.

It is among the advantages of the present invention that impacts from a multiplicity of disc elements have been found in damp vibrations more effectively than do impacts from only one or several disc elements. When around five or more disc elements are used, and such a number is contemplated herein by the term "multiplicity of disc elements," the impacts of individual disc elements are effective in counteracting complex harmonic sub-vibrations that cannot be effectively damped by a lesser number of disc elements in the bore of the vibrating member. These sub-vibrations are the result of the interaction forces between the tool and work, forces that continually vary during the machining operation In a preferred form of the invention, the bore of the vibrating member has a diameter equal to one half the external diameter of the member, a ratio that decreases the stiffness of the member by only 6.25 percent; and a package of fifteen disc elements having the overall axial length of from five to ten bore diameters, is disposed in this bore under slight axial pressure, as previously described. Because of the large number of disc elements complex sub-harmonic vibrations of the member can be counteracted by the varied impacts of individual disc elements occurring, at small time differentials as determined by the nature and amplitude of the vibrations in the vicinity of each disc element.

As a result, vibrations of the member are effectively damped, and this damping is characterized by a very high decay rate, a result that is most desirable in boring bars and similar tools. For example, boring bars of tungsten carbide (which have the advantage of great stiffness) normally have, on account of said stiffness, a very low vibration decay rate that tends to offset their other advantages in certain applications. However, when tungsten carbide boring bars were equipped with the present invention, their vibrations were effectively damped and the decay rate was very high. Another feature of the present invention is that the disc elements are effective in damping vibrations both when the vibrating member is stationary and when rotating about its longitudinal axis. Furthermore, when the disc elements are assembled on their rod, they become a unitary packaged element that can be easily removed from the bore of the member for replacement with another packaged unit or for use in another vibrating member.

In every case the disc elements are rigid and circular and have their opposite faces smooth and parallel and the disc elements are held in face to face engagement. The disc elements, in being rigid, deliver sharp impacts to the vibrating member and, in being heavy, cause the impacts to transmit sufficient energy to the vibrator member to destroy the pattern of self excited vibration in the member.

Figure 7:
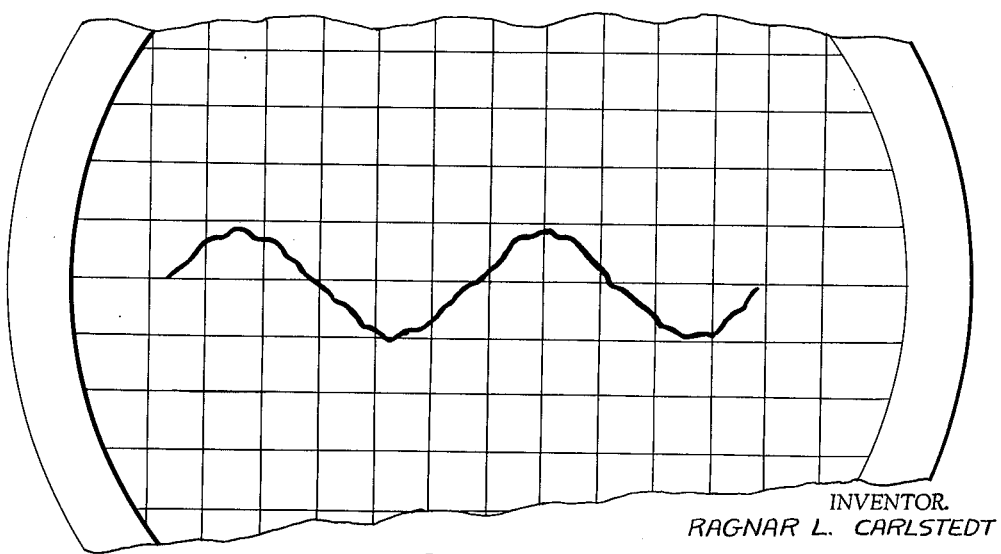

The impact discs according to the present invention operate substantially differently than would occur if a corresponding amount of mass were to be embodied in the form of shot or the like and placed in the cavity. The discs are heavy and deliver a substantial amount of energy to the vibrating member when they impact thereon. The manner in which the impact weights operate in a boring bar of the nature illustrated in FIGURE 1, for example, is shown in FIGURES 6 and 7. These figures are drawings illustrating oscilloscope traces with the trace in FIGURE 6 showing the manner in which a boring bar vibrates when subjected to a predetermined disturbing force and without there being any damping devices in the boring bar. It will be noted that the vibratory pattern is substantially a sine wave and that there is no apparent damping.

In FIGURE 7 there is shown a trace of the same bar subjected to the same disturbing force but wherein the bar contains a damping device according to the present invention. It will be observed that the amount of vibration is substantially reduced in amplitude and that the curve depicting the vibration is irregular with the irregularities being caused by the impacting of the impact elements of the damping device against the boring bar. It will be appreciated that the vibration pattern is interrupted by the impacts of the impact discs and this, accordingly, greatly reduces the amplitude of the vibration and prevents it from becoming self-excited or self-sustaining, whereby the vibration from a transitory influence will quickly decay while vibrations from a continuous influence will be greatly reduced in amplitude.

Corresponding traces could be obtained from a workpiece according to FIGURE 3 or from other vibratory elements adapted for utilizing the damping device of the present invention.

The method of the present invention is applicable to damping of torsional vibrations as well as lateral vibrations.

Figure 8:
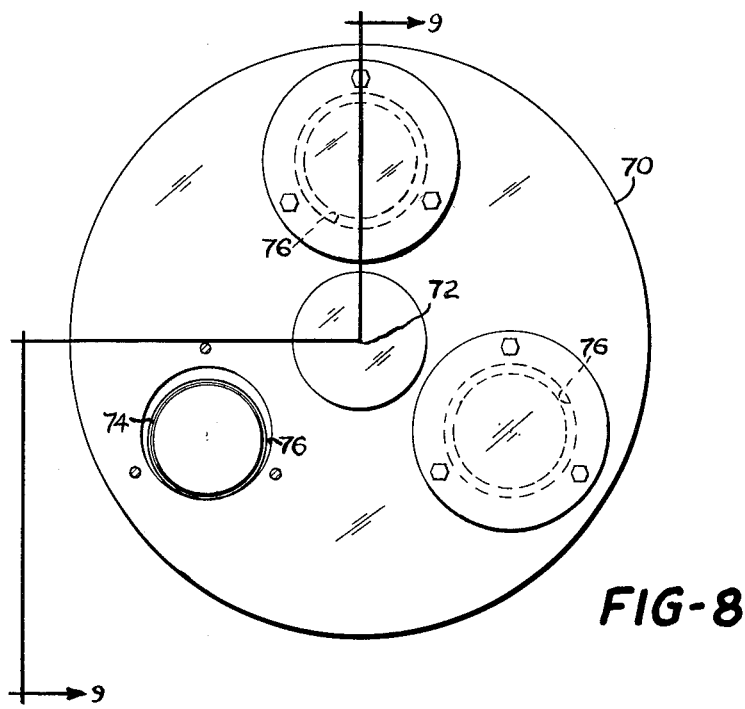
FIGURES 8 and 9 show the application of the invention for damping out torsional vibrations.
Figure 9:
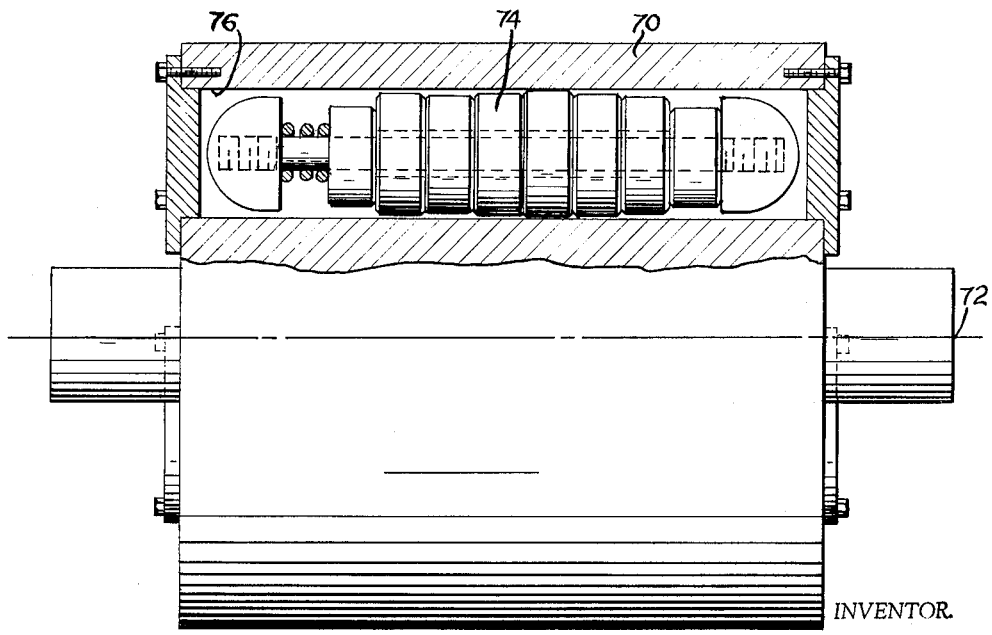

FIGURES 8 and 9 show the application of the invention to a piece subject to torsional vibration. The piece 70 is rotatable or oscillatable on an axis 72. To damp out torsional vibrations, impact elements 74 are mounted offset from axis 72, as by being placed in bores 76 in the form of packages.

The device of FIGURES 4 and 5 also lends itself to off center mounting for damping out torsional vibrations.

In the case of adaptation of the invention to any vibratory member, the number of impact elements, or packages thereof, and the particular sizes of the elements employed can be varied to meet the particular conditions encountered.

It will be understood that this invention is susceptible to modification in order to adapt it to different usages and conditions; and accordingly, it is desired to comprehend such modifications within this invention as may fall within the scope of the appended claims.

What is claimed is:

1. Apparatus for damping vibrations in a member having a longitudinal bore therein comprising; a plurality of rigid impact elements carried within said bore and having smooth parallel areas in face to face engagement, each said element having a dimension in the direction of vibration which is less than the diameter of said bore, and which said dimensions of said impact elements are also randomly varied, the clearance between said plurality of impact elements and said bore being such that the vibrations of said member will be opposed by the random impacts of said impact elements against the wall of said bore, and means to urge said parallel areas on adjacent impact elements in face to face engagement.

2. Apparatus for damping vibrations in a member having a longitudinal bore therein comprising; a plurality of rigid heavy disc elements positioned in said bore and having smooth parallel faces in face to face engagement, the said plurality of disc elements having diameters which are randomly varied and which are smaller than the diameter of said bore to provide a radial clearance between said disc elements and said bore so that the vibrations of the said member will be opposed by random radial impacts of said disc elements against the wall of said bore, and means to urge the said disc elements in face to face engagement and limit axial movement of said plurality of disc elements in said bore.

3. The combination of a working tool having a longitudinal bore therein and a vibration damping device, said device comprising; a plurality of rigid heavy disc inertia impact elements positioned in said bore and having smooth parallel faces in face to face engagement, the said plurality of disc elements having diameters which are randomly varied and which are all smaller than the diameter of said bore to provide a radial clearance between the said disc elements and said bore so that the vibrations of said tool member will be opposed by the random radial impacts of said disc elements against the wall of said bore, and means for adjustably maintaining a light axial pressure on the disc elements to keep them in face to face engagement and limit axial movement of said disc elements in said bore.

4. The combination of a workpiece having a longitudinal bore therein and an apparatus for damping vibrations in the workpiece comprising; a plurality of rigid heavy disc elements positioned in said bore and having smooth parallel faces in face to face engagement, the said plurality of disc elements having diameters which are randomly varied and which are smaller than the diameter of said bore to permit independent radial movement of said disc elements against the wall of said bore so that the vibrations of said workpiece will be opposed by the random radial impacts of said disc elements against the wall of said bore, and means for adjustably maintaining a light axial pressure on the disc elements to keep them in face to face engagement and for limiting axial movement of said disc elements in said bore.

5. Apparatus for damping transverse vibrations in a first member having a longitudinal bore of large diameter comprising; a second member and first means for removably positioning said second member in said bore so as to be radially immovable relative thereto, said second member having a longitudinal bore substantially co-axial with the bore of said first member, a plurality of rigid heavy disc elements positioned in the bore of said second member and having smooth parallel faces in face to face engagement, the said plurality of disc elements having diameters which are randomly varied and which are all smaller than the diameter of the bore of said second member to permit independent radial movement of said disc elements against the wall of said bore of said second member so that the transverse vibrations of said first member which are transferred to said second member via said first means will be opposed by the random radial impacts of said disc elements against the wall of the bore of said second member, and means for adjustably maintaining a light axial pressure on the disc elements to keep them in face to face engagement and for limiting axial movement of said disc elements in said bore.

6. A vibration damping apparatus adapted to be inserted in a member having a longitudinal bore and which member is subject to transverse vibrations comprising; a plurality of rigid heavy disc elements having smooth parallel faces in face to face engagement and adapted to be positioned in said bore, the said plurality of disc elements having diameters which are randomly varied and which are smaller than the diameter of said bore to provide a radial clearance between said disc elements and said bore so that the transverse vibrations of the said member will be opposed by random radial impacts of said disc elements against the wall of said bore, and means to urge the said disc elements in face to face engagement and to limit axial movement of said plurality of disc elements in said bore.

7. A vibration damping apparatus adapted to be inserted in a member having a longitudinal bore and which member is subject to transverse vibrations comprising; a plurality of rigid heavy disc elements having smooth opposed parallel faces in face to face engagement, the said plurality of disc elements having diameters which are randomly varied and which are all smaller than the diameter of said bore to permit independent radial movement of said disc elements against the wall of said bore so that the transverse vibrations of said member will be opposed by the random radial impacts of said disc elements against the wall of said bore, means for maintaining said plurality of disc elements as a package unit to be inserted in said bore, and means for adjustably maintaining a light axial pressure on the said disc elements to keep them in face to face engagement.

8. A vibration damping apparatus adapted to be inserted in a member having a longitudinal bore and which member is subject to transverse vibrations comprising; a plurality of rigid heavy disc elements having smooth opposed parallel faces in face to face engagement, the said plurality of disc elements having diameters which are randomly varied and which are all smaller than the diameter of said bore to permit independent radial movement of said disc elements against the wall of said bore so that the transverse vibrations of said member will be opposed by the random radial impacts of said disc elements against the wall of said bore, each said element being further provided with a central hole therethrough, a rod passing through the holes of said disc elements, the clearance between the rod and the central holes of said disc elements being large enough to permit the independent radial movement of the said disc elements against the wall of said bore, and retaining means at each end of said rod for retaining the disc elements thereon.

9. Apparatus as claimed in claim 8 in which the retaining means at one end of the rod includes resilient means for lightly pressing the disc elements axially against one another.

10. A vibration damping apparatus adapted to be inserted in a member having a longitudinal bore and which member is subject to transverse vibrations comprising; a plurality of rigid heavy disc elements having smooth opposed parallel faces in face to face engagement, the said plurality of disc elements having diameters which are randomly varied and which are all smaller than the diameter of said bore to permit independent radial movement of said disc elements against the wall of said bore so that the transverse vibrations of said member will be opposed by the random radial impacts of said disc elements against the wall of said bore, each said disc element being further provided with a central hole there through, a rod passing through the holes of said disc elements, the said disc elements having randomly varied diameters being placed on said rod in random order, the clearance between the rod and the central holes of said disc elements being large enough to permit the independent radial movement of the said disc elements against the wall of said bore, and retaining means at each end of said rod for retaining the disc elements thereon, the retaining means at one end of said rod including resilient means for lightly pressing the disc elements axially against one another.

11. The vibration damping apparatus as claimed in claim 10 further comprising means for limiting axial movement of said apparatus in said bore.

12. Apparatus for damping transverse vibrations in a first member having a longitudinal bore of large diameter comprising; a second member and first means for removably positioning said second member in said bore so as to be radially immovable relative thereto, said second member having a longitudinal bore substantially co-axial with the bore of said first member, a plurality of rigid heavy disc elements positioned in the bore of said second member and having smooth parallel faces in face to face engagement, the said plurality of disc elements having diameters which are randomly varied and which are all smaller than the diameter of the bore of said second member to permit independent radial movement of said disc elements against the wall of said bore of said second member so that the transverse vibrations of said first member which are transferred to said second member via said first means will be opposed by the random radial impacts of said disc elements against the wall of the bore of said second member, each said disc element being further provided with a central hole therethrough, a rod passing through the holes of said disc elements, the clearance between the rod and the central holes of said disc elements being large enough to permit the independent radial movement of the said disc elements against the wall of said bore of said second member, and retaining means at each end of said rod for retaining the disc elements thereon, the retaining means at one end of said rod including resilient means for lightly pressing the disc elements axially against one another.

13. The method of minimizing vibration in a member which comprises; holding a plurality of impact inertia elements in relatively free sliding direct face to face relation in said member, limiting the extend of motion of said elements in said member by dimensioning them according to a random pattern and to a size which permits a small clearance between said elements and said member in the direction of vibration, and when the member vibrates randomly impacting at least some of said elements against said member in a direction substantially parallel to the direction of motion of said member and at chronologically randomly spaced intervals with respect to the frequency of vibration of the member.

14. The method of minimizing vibration in the combination of a workpiece member and a tool member engagin the workpiece member which comprises; holding a plurality of impact inertia elements in substantially free sliding direct face to face relation in at least one member of said combination, confining the extent of motion of said elements in said one member by dimensioning said elements according to a random pattern which permits a small clearance between said elements and said member in the direction of vibration, and when one of said members vibrates chronologically randomly impacting at least some of said elements against the said one member of said combination in a direction substantially parallel to the direction of motion of said one member.

15. The method of eliminating self induced vibration in a tool member comprising the steps of: positioning a plurality of disc-shaped impact inertia elements in relatively free sliding direct face to face relation in said member where the greatest vibration occurs, confining the extent of motion of said elements in said member by dimensioning the diameters of said elements according to a random pattern and to a size which permits a small clearance between said elements and said member in the direction of vibration, and randomly impacting at least some of said elements against said member in a direction substantially parallel to the direction of motion of said member when said member vibrates.

16. The method of eliminating vibration in a workpiece member caused by tool chatter comprising the steps of: positioning a plurality of disc-shaped impact inertia elements in relatively free sliding direct face to face relation in operative engagement with said workpiece member in the region of greatest vibration thereof, holding the impact inertia elements in face to face substantially free sliding relation, confining the extent of motion of said elements by dimensioning the said elements according to a random pattern and to a size which permits a small relative movement between said elements and said member in the direction of vibration of said member, and delivering random impacts from at least some of said elements to said member in a direction substantially parallel to the direction of motion of said member when said member tends to vibrate.

17. The method of eliminating vibration in a first member having a large internal bore therein comprising; concentrically mounting and removably fixing a rigid second member in said large internal diameter in rigid engagement with the wall of said bore, holding a plurality of disc-shaped impact elements in relatively free sliding direct face to face relationship in said second member, confining the extent of radial motion of said elements in said second member by dimensioning the diameters of said elements according to a random pattern and to a size which permits a small radial clearance between said elements and said second member, and randomly impacting at least some of said elements against said second member in a direction substantially parallel to the direction of motion of said first member.

18. The method of minimizing self-excited vibration from a vibratory member which comprises; nonyieldingly engaging the member in a region which is subject to oscillatory movement when the member vibrates by a plurality of heavy impact elements free to move in a direction having at least a component in a plane normal to the direction of vibration of said region of the member.

holding the elements in direct free sliding face to face relation, and confining the elements in their said direction of movement to an amount which is a small fraction of their dimensions in the said direction whereby any tendency to establish self-excited vibrations in the member is opposed by a plurality of non-simultaneous impacts of said elements on said member.

19. The method of minimizing self-excited vibration from a vibratory member which comprises; confining a plurality of heavy rigid impact elements in direct free sliding face to face engagement in a bore with a slight clearance between the bore wall and the impact elements and which elements are free to move laterally in the bore relative to each other, arranging the bore axis so as to have a substantial projection in a plane normal to the direction of vibration of said member such that initiation of vibration of said member will cause said movement of the elements in said bore and bring about random impacting of the elements against the bore wall, and effecting nonyielding connection of the bore wall with said member whereby the impacts of the elements on the bore wall will be transmitted to said member and prevent development in the member of self-excited vibration.

20. Apparatus for damping transverse vibrations of a member having a longitudinal bore, consisting of a multiplicity of heavy circular rigid disc elements having smooth parallel faces and carried within the bore in face to face engagement for radial movement relative to the circumferential wall of the bore, the radial clearance between the disc elements and wall being such that transverse vibrations of the member will be opposed by random radial impacts of the disc elements against the wall, each disc element being provided with a central axial hole therethrough, said disc elements having different diameters to provide for different amounts of freedom of movement of different ones of said disc elements and cause the impact of some of said disc elements to be delayed relative to the impacts of others of said disc elements, a rod passing through the holes of said disc elements, the clearance between the rod and the circumferential wall of each hole in the disc elements being greater than the clearance between that disc element and the wall of the bore, and retaining means at each end of the rod for retaining the disc elements thereon, the disc elements and rod and retaining means forming a unitary package.

21. Apparatus according to claim 20, in which the retaining means at one end of the rod includes resilient means for lightly pressing the disc elements axially against each other.

22. The combination of a member mounted on an axis and subject to vibration in a direction circumferential of said axis and vibration damping means, said member having at least one longitudinal bore therein, said vibration damping means being mounted within said bore and being disposed laterally of said axis, said vibration damping comprising a plurality of rigid heavy disc inertia impact elements positioned in said bore and having smooth parallel faces in face to face engagement, the said plurality of disc elements having diameters which are randomly varied and which are all smaller than the diameter of said bore to provide a radial clearance between the said disc elements and said bore so that the vibrations of said tool member will be opposed by the random radial impacts of said disc elements against the wall of said bore.

23. The arrangement according to claim 22 in which said member has a plurality of bores therein disposed circumferentially about said axis, and vibration damping means disposed in each of said bores.

24. The method of inhibiting torsional vibration in a member about an axis when the member is subjected to a disturbing force tending to create the said torsional vibrations which comprises; effecting rigid engagement of the member by a plurality of heavy grid inertia impact elements supported in free sliding direct face to face relation in a region spaced laterally from said axis, and establishing varying amounts of freedom of movement of said elements relative to said member whereby any tendency to establish self-excited vibrations in the member will develop chronologically random impacts of said elements against said member thereby inhibiting the development of self-sustained vibrations.

References Cited by the Examiner

UNITED STATES PATENTS 2,960,189   11/60   Osburn.

WILLIAM W. DYER, JR., *Primary Examiner.*